(12) United States Patent
Garabello et al.

(10) Patent No.: US 11,161,598 B2
(45) Date of Patent: Nov. 2, 2021

(54) TRANSFER BEARING COLLAPSING DEVICE

(71) Applicant: GE Avio S.r.l., Rivalta di Torino (IT)

(72) Inventors: Marco Garabello, Turin (IT); Paolo Altamura, Monopoli (IT); Gian Mario Bragallini, Turin (IT); Davide Lauria, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 163 days.

(21) Appl. No.: 16/481,708

(22) PCT Filed: Jan. 26, 2018

(86) PCT No.: PCT/EP2018/052015
§ 371 (c)(1),
(2) Date: Jul. 29, 2019

(87) PCT Pub. No.: WO2018/138295
PCT Pub. Date: Aug. 2, 2018

(65) Prior Publication Data
US 2019/0389562 A1 Dec. 26, 2019

(30) Foreign Application Priority Data
Jan. 30, 2017 (EP) .................... 17425009

(51) Int. Cl.
*B64C 11/40* (2006.01)
*B64C 11/38* (2006.01)
(Continued)

(52) U.S. Cl.
CPC ............ *B64C 11/40* (2013.01); *B64C 11/385* (2013.01); *B64C 11/42* (2013.01); *F01D 7/00* (2013.01); *F05D 2260/74* (2013.01)

(58) Field of Classification Search
CPC ....... B64C 11/38; B64C 11/385; B64C 11/40; B64C 11/42; F01D 7/00; F05D 2260/74;
(Continued)

(56) References Cited

U.S. PATENT DOCUMENTS

| 2,791,283 A | 5/1957 | Lambeck et al. |
| 2,998,080 A | 8/1961 | Moore, Jr. |

(Continued)

FOREIGN PATENT DOCUMENTS

| CN | 104494811 A | 4/2015 |
| CN | 104554708 A | 4/2015 |

(Continued)

OTHER PUBLICATIONS

Communication to European Patent Office, dated Jan. 31, 2019.*
(Continued)

*Primary Examiner* — Christopher Verdier
(74) *Attorney, Agent, or Firm* — Dority & Manning, P.A.

(57) ABSTRACT

A system for feathering a propeller assembly disposed within a housing of the propeller assembly has a sleeve defining an outer wall and one or more sleeve tabs extended outward in a radial direction along at least a circumferential portion of the sleeve, wherein the one or more sleeve tabs is separated from the outer wall in an axial direction, a retainer defining one or more retainer tabs extended inward in the radial direction, wherein the one or more retainer tabs is disposed between the outer wall and the one or more sleeve tabs of the sleeve along the axial direction, and a beta tube assembly extended through the sleeve along the axial direction. The beta tube assembly defines one or more internal walls. The one or more internal walls defines a hydraulic fluid transfer cavity in fluid communication with one or more hydraulic fluid transfer orifices.

20 Claims, 5 Drawing Sheets

(51) Int. Cl.
*B64C 11/42* (2006.01)
*F01D 7/00* (2006.01)

(58) Field of Classification Search
CPC .... F03D 7/0224; F03D 7/0264; F03D 7/0268; F05B 2260/74; F04D 29/323; F04D 29/362; F04D 29/364; F03B 3/06; F03B 3/123; F03B 3/14; F03B 3/145
See application file for complete search history.

(56) References Cited

U.S. PATENT DOCUMENTS

| | | | |
|---|---|---|---|
| 3,734,642 | A | 5/1973 | Dixon |
| 5,186,079 | A | 2/1993 | Gee |
| 5,186,608 | A * | 2/1993 | Bagge ................... B64C 11/38 416/147 |
| 8,753,084 | B2 | 6/2014 | Morgan |
| 9,366,147 | B2 | 6/2016 | Gallet |
| 2013/0236234 | A1 | 9/2013 | Kaczynski |
| 2015/0308286 | A1 | 10/2015 | Korshikov et al. |
| 2017/0066523 | A1* | 3/2017 | Miszkiewicz ............ F02C 3/04 |

FOREIGN PATENT DOCUMENTS

| | | |
|---|---|---|
| GB | 2254893 A | 10/1992 |
| GB | 2260821 A | 4/1993 |
| WO | WO97/17252 A1 | 5/1997 |
| WO | WO97/17253 A1 | 5/1997 |

OTHER PUBLICATIONS

European Search Report Corresponding to EP174250092 dated Jul. 21, 2017.

PCT Search Report Corresponding to PCT/EP2018/052015 dated Apr. 13, 2018.

* cited by examiner

TRANSFER BEARING COLLAPSING DEVICE

GOVERNMENT SPONSORED RESEARCH

The project leading to this application has received funding from the Clean Sky 2 Joint Undertaking under the European Union's Horizon 2020 research and innovation program under grant agreement No. CS2-ENG-GAM-2014-2015-01.

FIELD

The present subject matter is generally related to variable pitch propeller assemblies.

BACKGROUND

Variable pitch propeller assemblies are generally included on wind turbines, gas turbine engines, such as turboprops, or reciprocating engines. Adjusting the pitch of one or more propellers, also called feathering, is performed to adjust an amount of drag force from the propellers. For example, in aircraft equipped with turboprop engines, feathering may be employed to adjust propeller speed relative to a rotational speed of an engine core. In another example, feathering may be employed following an undesired shutdown of the turbine, such as an in-flight shutdown of an aircraft, or failure, repairs, or maintenance of a wind turbine. During such shutdowns, feathering is generally employed to pitch the one or more blades of the propeller to reduce or eliminate drag and/or remain substantially stationary (i.e. not rotating) while the turbine is non-operating.

However, known solutions for feathering during or following an undesired shutdown of the turbine may include complex or redundant systems that may risk failure themselves. Therefore, there is a need for a failsafe system and/or method of feathering a propeller following an undesired shutdown of the turbine.

BRIEF DESCRIPTION

Aspects and advantages of the invention will be set forth in part in the following description, or may be obvious from the description, or may be learned through practice of the invention.

The present disclosure is directed to a system for feathering a propeller assembly, wherein the system is disposed within a housing of the propeller assembly. The system includes a sleeve defining an outer wall and one or more sleeve tabs extended outward in a radial direction along at least a circumferential portion of the sleeve, wherein the one or more sleeve tabs is separated from the outer wall in an axial direction. The system further includes a retainer defining one or more retainer tabs extended inward in the radial direction, wherein the one or more retainer tabs is disposed between the outer wall and the one or more sleeve tabs of the sleeve along the axial direction. Still further, the system includes a beta tube assembly extended through the sleeve along the axial direction, wherein the beta tube assembly defines one or more internal walls, wherein the one or more internal walls defines a hydraulic fluid transfer cavity in fluid communication with one or more hydraulic fluid transfer orifices.

In one example, the system further includes a second retainer defining one or more second retainer tabs extended inward in the radial direction, wherein the one or more sleeve tabs is disposed between the one or more retainer tabs and the one or more second retainer tabs.

In various examples of the system, at least the retainer tabs of the retainer are defined by a frangible material configured to detach from the retainer at a force corresponding to a critical torque value applied by the beta tube assembly onto the sleeve.

In yet another example of the system, the retainer tabs define a first material and the sleeve defines a second material, and wherein the first material defines an ultimate tensile strength less than the second material.

In still another example, the retainer tabs define a first material and the sleeve defines a second material, and wherein the first material defines an ultimate tensile strength less than the second material at approximately a force applied by the sleeve during an overtorque condition.

In one example, at least the sleeve tabs of the sleeve are defined by a frangible material configured to detach from the sleeve at a force corresponding to a critical torque value applied by the sleeve to the retainer.

In another example of the system, the sleeve tabs define a first material, and wherein the outer wall and the retainer define a second material, and wherein the first material defines an ultimate tensile strength less than the second material.

In various examples of the system, the sleeve defines an axial space between the one or more sleeve tabs and the outer wall in the axial direction.

In still various examples of the system, the one or more retainer tabs is disposed in the axial space defined by the sleeve.

In one example of the system, the sleeve and the beta tube assembly define radially therebetween a first fluid cavity and a second fluid cavity separated from the first fluid cavity by one or more internal sleeve walls.

In another example of the system, the sleeve defines one or more sleeve fluid inlet ports in fluid communication with the hydraulic fluid transfer cavity.

A further aspect of the present disclosure is directed to a method of feathering propeller assembly in an overtorque condition, wherein the feathering propeller assembly failsafe includes a beta tube assembly surrounded by a sleeve within a housing, and a retainer. The method includes coupling the retainer in serial arrangement with the sleeve and the beta tube assembly; inducing an overtorque condition on the sleeve via seizure of hydraulic fluid within the system; decoupling the retainer from the sleeve; and translating the beta tube assembly and the sleeve.

In one example of the method, decoupling the retainer from the sleeve includes decoupling each retainer tab from the sleeve and/or sleeve tabs.

In another example of the method, decoupling the retainer from the sleeve includes decoupling each sleeve tab from the retainer and/or retainer tabs.

In various examples, the method further includes coupling one or more retainer tabs of a frangible material to one or more sleeve tabs, wherein the frangible material defines an ultimate tensile strength less than approximately a force applied to the one or more retainer tabs during an overtorque condition on the sleeve.

In still various examples, the method further includes coupling one or more sleeve tabs of a frangible material to one or more retainer tabs, wherein the frangible material defines an ultimate tensile strength less than approximately than a force applied to the one or more sleeve tabs during an overtorque condition on the sleeve.

Yet another aspect of the present disclosure is directed to a gas turbine engine defining a feathering failsafe system. The gas turbine engine includes a propeller assembly comprising hollow piston rod extended along an axial direction and a plurality of blades rotatable about an axial centerline and configured to rotate about a pitch axis extended from the axial centerline; a housing, wherein the propeller assembly and the housing are disposed in adjacent arrangement along the axial direction; and a feathering mechanism defined in the propeller assembly and the housing. The feathering mechanism includes a sleeve defining an outer wall and one or more sleeve tabs extended outward in a radial direction along at least a circumferential portion of the sleeve, wherein the one or more sleeve tabs is separated from the outer wall in an axial direction; a retainer defining one or more retainer tabs extended inward in the radial direction, wherein the one or more retainer tabs is disposed between the outer wall and the one or more sleeve tabs of the sleeve along the axial direction; and a beta tube assembly extended through the sleeve along the axial direction, wherein the beta tube assembly defines one or more internal walls, wherein the one or more internal walls defines a hydraulic fluid transfer cavity in fluid communication with one or more hydraulic fluid transfer orifices.

In various examples of the gas turbine engine the feathering mechanism further includes a second retainer defining one or more second retainer tabs extended inward in the radial direction, wherein the one or more sleeve tabs is disposed between the one or more retainer tabs and the one or more second retainer tabs.

In still various examples of the gas turbine engine, at least the retainer tabs of the retainer are defined by a frangible material configured to detach from the retainer at a force corresponding to a critical torque value applied by the beta tube assembly onto the sleeve.

In yet still various examples of the gas turbine engine, the retainer tabs define a first material and the sleeve defines a second material, and wherein the first material defines an ultimate tensile strength less than the second material.

These and other features, aspects and advantages of the present invention will become better understood with reference to the following description and appended claims. The accompanying drawings, which are incorporated in and constitute a part of this specification, illustrate aspects of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
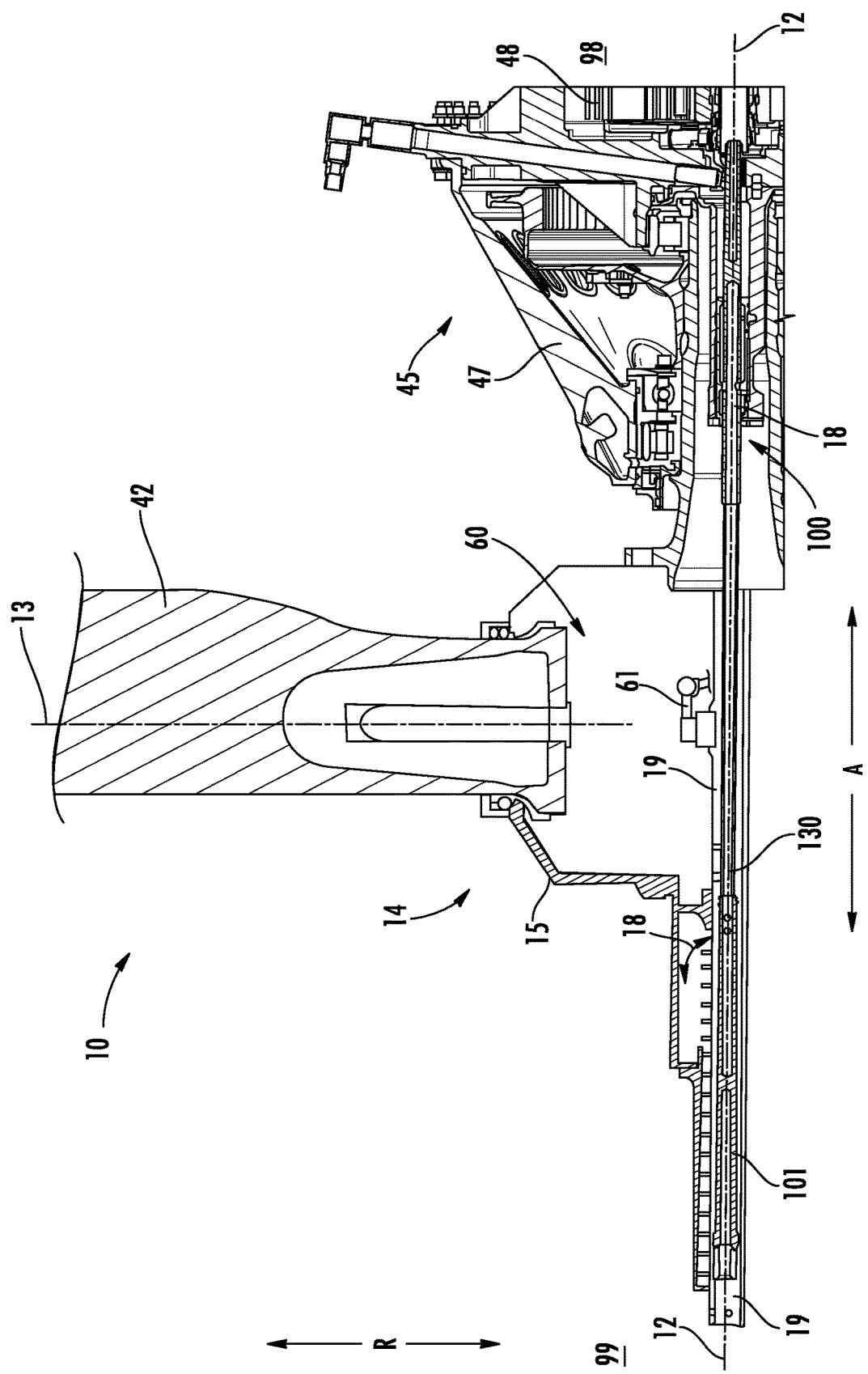
FIG. 1 is a cross sectional side view of an exemplary embodiment of a propeller and gearbox assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Systems and methods for a feathering failsafe for a propeller assembly are generally provided that may simplify and/or remove redundant systems of a feathering system of the propeller assembly. The system for a feathering failsafe generally includes a retainer defining one or more retainer tabs disposed axially between a first portion and second portion of a static sleeve surrounding a hydraulic fluid transfer tube. The retainer tabs prevent axial movement of the static sleeve during normal operation of the propeller assembly. During or following an overtorque condition of the propeller assembly, the retainer tabs and/or a portion of the static sleeve break or displace and enable axial movement of the sleeve and hydraulic fluid transfer tube which then enable feathering of the one or more blades of the propeller assembly.

The systems and methods shown and described in the present disclosure may improve upon existing feathering and feathering failsafe systems by reducing a quantity of parts or components of the system, providing a simpler structure and/or method of replacing failsafe components, and/or improving overall propeller assembly and turbine safety by providing an automatic feathering position system.

Although discussed further herein at least in part in the context of a propeller assembly for a turboprop engine, the present disclosure is applicable to propeller assemblies including feathering or variable pitch systems in general, including wind turbines, gas turbines, and reciprocating engines.

Referring now to FIG. 1, a cross sectional side view of an exemplary embodiment of a portion of a turbine 10 including exemplary embodiments of a propeller assembly 14 and a gearbox 45 together defining a pitch-adjustment or feathering mechanism 60. The turbine 10 defines an axial direction A, a radial direction R, a circumferential direction C (shown in FIG. 2), a first end 99 and a second end 98 opposite of the first end along axial direction A. The propeller assembly 14 and the gearbox 45 are disposed in adjacent arrangement along the axial direction A. An axial centerline 12 is defined through the propeller assembly 14 and the gearbox 45 along the axial direction A. The propeller assembly 14 is disposed proximate to the first end 99 of the turbine 10. The gearbox 45 is disposed proximate to the second end 98 of the turbine 10.

The propeller assembly 14 is adjacent to a housing 47 containing and coupled to at least a portion of the feathering mechanism 60. The housing 47 may include the gearbox 45 in which a plurality of gears 48 is contained. The propeller assembly 14 includes a plurality of blades 42 in adjacent arrangement along the circumferential direction C, in which the plurality of blades 42 are rotatable about the axial centerline 12. The propeller assembly 14 includes a hub 15 into which the plurality of blades 42 are placed and extend from in the radial direction R. The propeller assembly 14 further includes at least one hollow piston rod 19 extended along the axial direction A. The piston rod 19 is coupled to a feathering lever 61. The feathering lever 61 is further coupled to the plurality of blades 42 such that movement of the feathering lever 61 along the axial direction A translates into rotational movement of the plurality of blades 42 about a pitch axis 13 extended in the radial direction R from the axial centerline 12, in which each pitch axis 13 is relative to each blade 42.

The feathering mechanism 60 defined in the propeller assembly 14 and the housing 47 includes a beta tube assembly 130 extended through the hollow piston rod 19. The beta tube assembly 130 extends at least partially through the propeller assembly 14 and at least partially through the housing 47 in coaxial alignment with the axial centerline 12. The beta tube assembly 130 defines an at least partially hollow walled pipe 101 extended along the axial direction A. The beta tube assembly 130 may further define retention features relative to the piston rod 19 through which it extends. For example, in one embodiment, the beta tube assembly 130 may define external threads corresponding to internal threads within the hollow piston rod 19.

Figure 5:
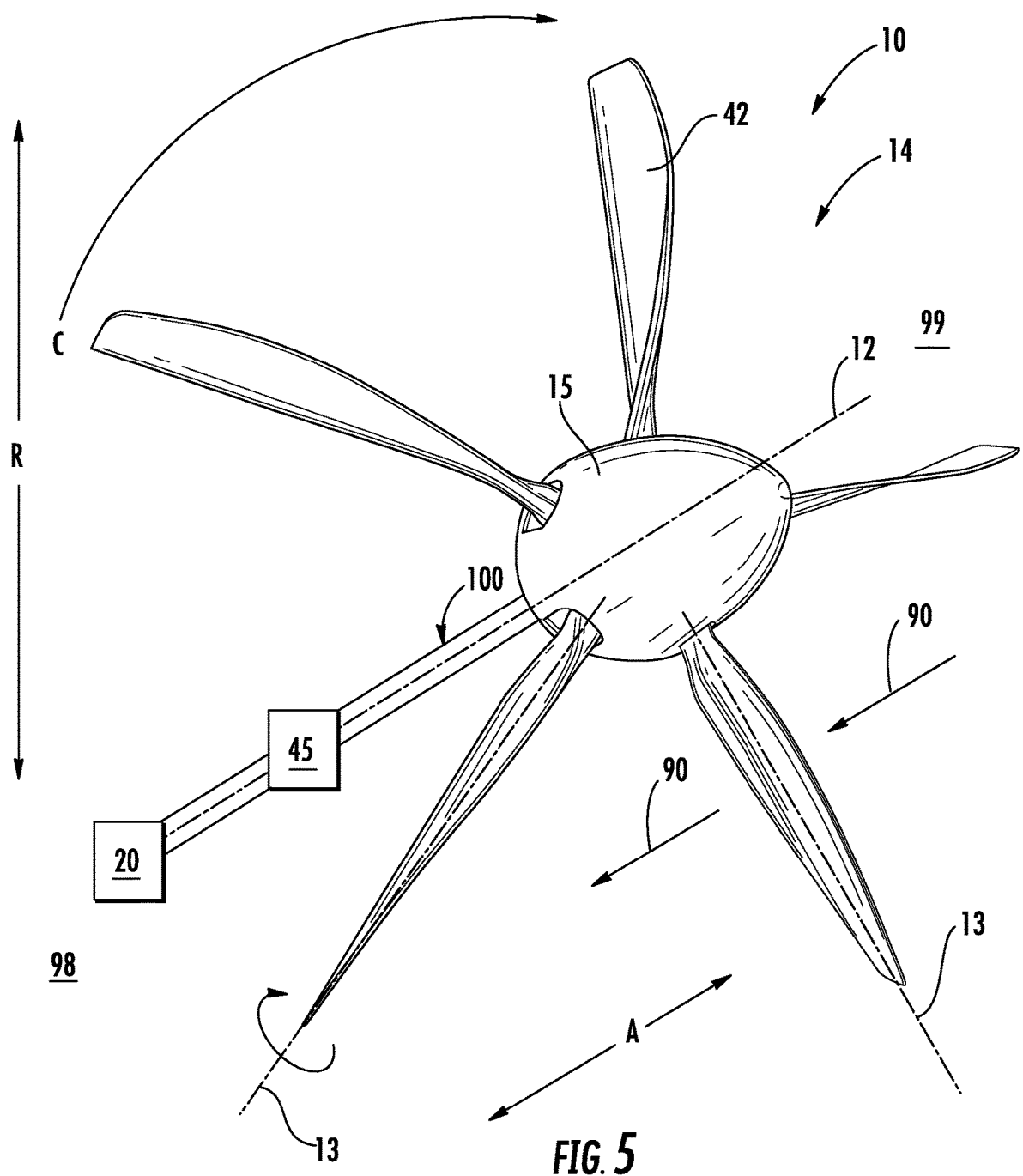
FIG. 5 is a schematic perspective view of an exemplary embodiment of a turbine engine including the propeller assembly and gearbox of FIG. 1.

The gearbox 45 defines a power or reduction gearbox coupling the propeller assembly 14 to a generator or engine core 20 (shown in FIG. 5). In one embodiment, the generator or engine core 20 may include turbomachinery, such as turboprop, turboshaft, or propfan engine configurations defining a compressor section and a turbine section generating mechanical energy. Mechanical energy produced by the generator or engine core 20 transmits through the gearbox 45 to generate a desired torque and rotational speed for the propeller assembly 14 to rotate and operate. In another embodiment, the generator or engine core 20 defines a reciprocating engine coupled to the gearbox 45 as described in regard to turbomachinery. In yet another embodiment, the generator or engine core 20 may include an electrical generator such as defined in wind or hydro turbines. The propeller assembly 14 may rotate due to passing of a fluid, such as air or water, across the plurality of blades 42 of the propeller assembly 14. The mechanical energy from the rotation of the propeller assembly 14 is transmitted through the gearbox 45 to a desired mechanical torque or speed to the generator or engine core 20. The generator or engine core 20 may convert the mechanical energy into electrical energy for further distribution.

Figure 2:
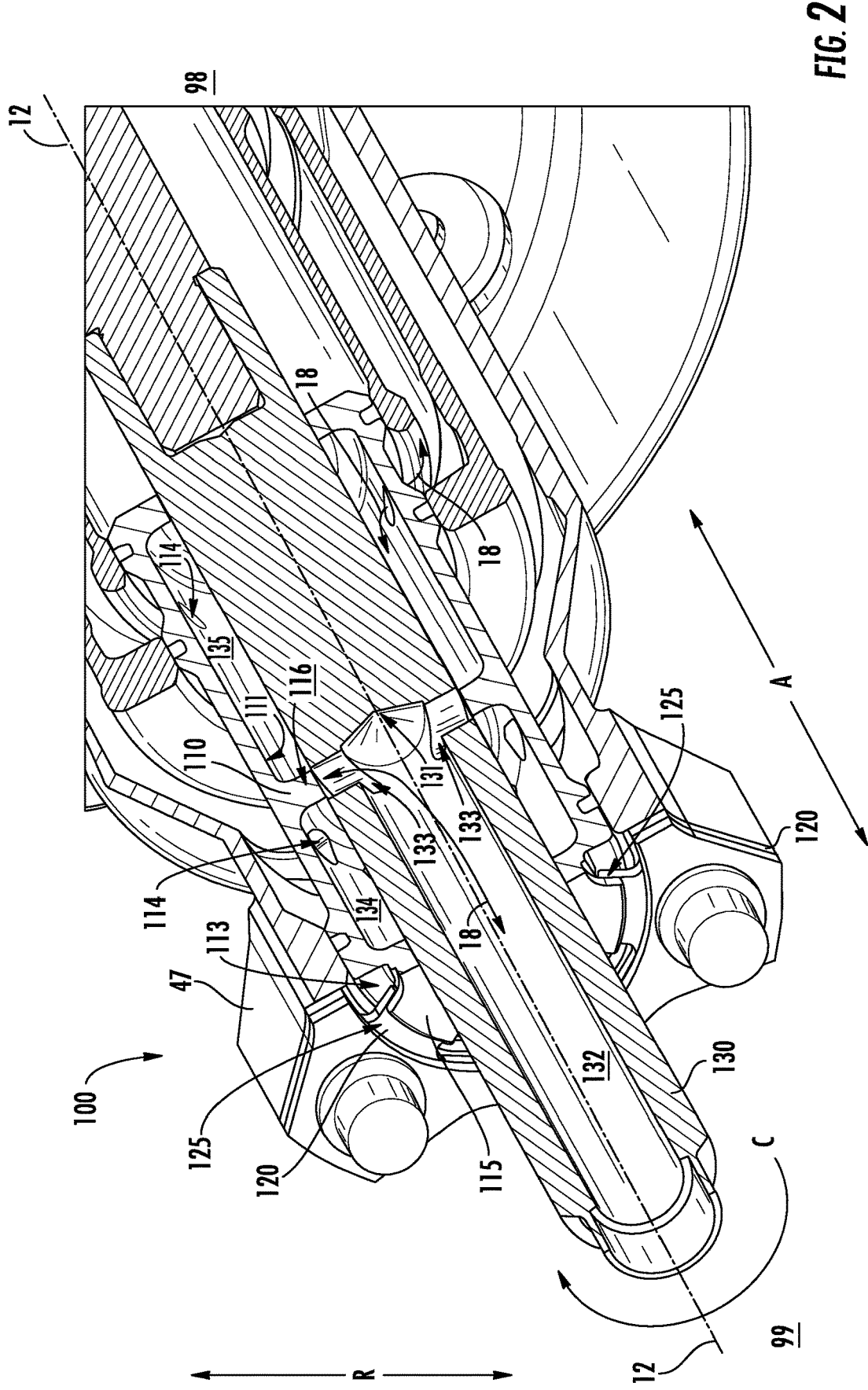
FIG. 2 is a cutaway perspective view of a portion of the gearbox assembly shown in FIG. 1.

Referring now to FIG. 2, a perspective view of an exemplary embodiment of a feathering failsafe system 100 defined within the housing 47. The system 100 includes a sleeve 110 defining an outer wall 111 and one or more sleeve tabs 115 extended outward in the radial direction R along at least a circumferential portion of the sleeve 110. The one or more sleeve tabs 115 is/are separated from the outer wall 111 in the axial direction A. The sleeve 110 may define an axial space 113 between the one or more sleeve tabs 115 and the outer wall 111 in the axial direction A.

The system 100 further includes a retainer 120 defining one or more retainer tabs 125 extended inward in the radial direction R. The one or more retainer tabs 125 is/are disposed between the outer wall 111 and the one or more sleeve tabs 115 of the sleeve 110 along the axial direction A. The retainer 120 is at least partially defined in the axial space 113 between the one or more sleeve tabs 115 and the outer wall 111 in the axial direction A. In one embodiment, the one or more retainer tabs 125 is/are defined in the axial space 113.

The system 100 further includes a beta tube assembly 130 extended through the sleeve 110 along the axial direction A. The beta tube assembly 130 defines one or more internal walls 131 in which the one or more internal walls 131 defines a hydraulic fluid transfer cavity 132 in fluid communication with one or more hydraulic fluid transfer orifices 133. The beta tube assembly 130 defines an at least partially hollow walled pipe extended along the axial direction A.

In various embodiments, the sleeve 110 may define one or more sleeve fluid inlet ports 114 through the outer wall 111 of the sleeve 110. The sleeve 110 and the beta tube assembly 130 may define radially therebetween a first fluid cavity 134. In one embodiment, the sleeve 110 further defines a second fluid cavity 135 separated from the first fluid cavity 134 along the axial direction A by one or more internal sleeve walls 116 extended within the outer wall 111 in the radial direction R toward and abutting the beta tube assembly 130.

The sleeve fluid inlet ports 114 may define an orifice through which a hydraulic fluid (e.g. oil) transfers through the sleeve 110. In various embodiments, the hydraulic fluid, shown schematically by arrows 18, flows through the housing 47 and through the one or more sleeve fluid inlet ports 114 into the first fluid cavity 134. The hydraulic fluid 18 flows from the first fluid cavity 134 through the one or more hydraulic fluid transfer orifices 133 defined in the beta tube assembly 130 and into the hydraulic fluid transfer cavity 132. Changes in a pressure and force from the hydraulic fluid 18 cause the beta tube assembly 130 to translate along the axial direction A. For example, an increase in pressure and force of hydraulic fluid 18 toward the second end 98 may cause the beta tube assembly 130 to translate toward the second end 98. Referring to FIGS. 1 and 2, the beta tube assembly 130 is coupled to the piston rod 19, which is coupled to the feathering lever 61 to cause rotation of the plurality of blades 42 about the pitch axis 13.

During abnormal or malfunctioning operation of the feathering mechanism 60, the gearbox 45, the plurality of blades 42, or other components of the turbine 10, the beta tube assembly 130 may seize, bind, or otherwise be obstructed from translation along the axial direction A toward the second end 98. In one example, the hydraulic fluid 18 may fail to flow or change pressure across one or more of the hydraulic fluid transfer orifices 133, the first cavity 134, the second cavity 135, or other orifices and/or cavities. In another example, the beta tube assembly 130 may bind or seize onto the sleeve 110 due to misalignment (e.g. the sleeve 110 and the beta tube assembly 130 are misaligned or not coaxial along the axial centerline 12). The resulting abnormal, malfunctioning, or misalignment may result in an overtorque condition of the propeller assembly 14. In various embodiments, the overtorque condition may result from a rate of change in angle about the pitch axis 13 of the plurality of blades 42 greater than a rate of change that may be accommodated by engine controls (e.g. changes in hydraulic fluid 18 pressure, flow, or rate of translation of the beta tube assembly 130).

During abnormal or malfunctioning operation of the feathering mechanism 60, a portion of the retainer 120 and/or the sleeve 110 is configured to break or yield under a pressure or load equivalent to a pressure or load applied from the beta tube assembly 130 onto the retainer 120 and/or sleeve 110, thereby allowing movement of the beta tube assembly 130 and sleeve 110 along the axial direction A toward the second end 98 to feather the plurality of blades 42 (i.e. rotate the blades 42 about the pitch axis 13 to the desired position). In one embodiment, the retainer tabs 125 break or yield and allow the beta tube assembly 130 and sleeve 110 to translate along the axial direction A. In another embodiment, the sleeve tabs 115 break or yield to allow the beta tube assembly 130 and the sleeve 110 to translate.

In various embodiments, the retainer tabs 125 define a frangible material configured to detach from the retainer at a force corresponding to a critical torque value applied by the beta tube assembly 130 onto the sleeve 110. In one embodiment, the retainer tabs 125 each define a first material and the sleeve 110 defines a second material different from the first material, in which the first material defines an ultimate tensile strength less than the second material. In another embodiment, the first material defines an ultimate tensile strength less than approximately a force applied by the sleeve 110 onto the retainer 120 during an overtorque condition.

In other embodiments, at least the sleeve tabs 115 of the sleeve 110 are defined by a frangible material configured to detach from the retainer at a force corresponding to a critical torque value applied by the beta tube assembly 130 onto the sleeve 110. In one embodiment, the sleeve tabs 115 each define a first material and the retainer 120 defines a second material different from the first material, in which the first material defines an ultimate tensile strength less than the second material.

In various embodiments, the critical torque value is a value of torque greater than a specified maximum torque output of the turbine 10 and thus resulting in the overtorque condition. In one embodiment, the overtorque condition may result from a sudden or sustained increase or decrease in resistance from the propeller assembly 14 relative to the generator or engine core 20. In another embodiment, the overtorque condition may result from a sudden or sustained increase or decrease in power or torque output from the generator or engine core 20 relative to the propeller assembly 14. The specified maximum torque output of the turbine 10 may generally be specific to an apparatus to which the turbine 10 is attached. In one embodiment, the critical torque value is approximately greater than 100% to approximately 250% of the specified maximum torque output of the turbine 10. In another embodiment, the critical torque value is approximately greater than 100% to approximately 150% of the specified maximum torque output of the turbine 10. In still another embodiment, the critical torque value is approximately 115% or greater of the specified maximum torque output of the turbine 10.

Referring still to FIGS. 1-2, the sleeve 110 defines the sleeve tabs 115 and/or the retainer 120 defines the retainer tabs 125 as a living hinge. The sleeve tabs 115 and/or retainer tabs 125 may define the living hinge such that a load or force corresponding a critical torque value is to applied from the sleeve 110 onto the retainer tabs 125 and/or sleeve tabs 115 to permit displacement of the retainer tabs 125 or sleeve tabs 115 and permit translation of the sleeve 110 along the axial direction A.

Figure 3:
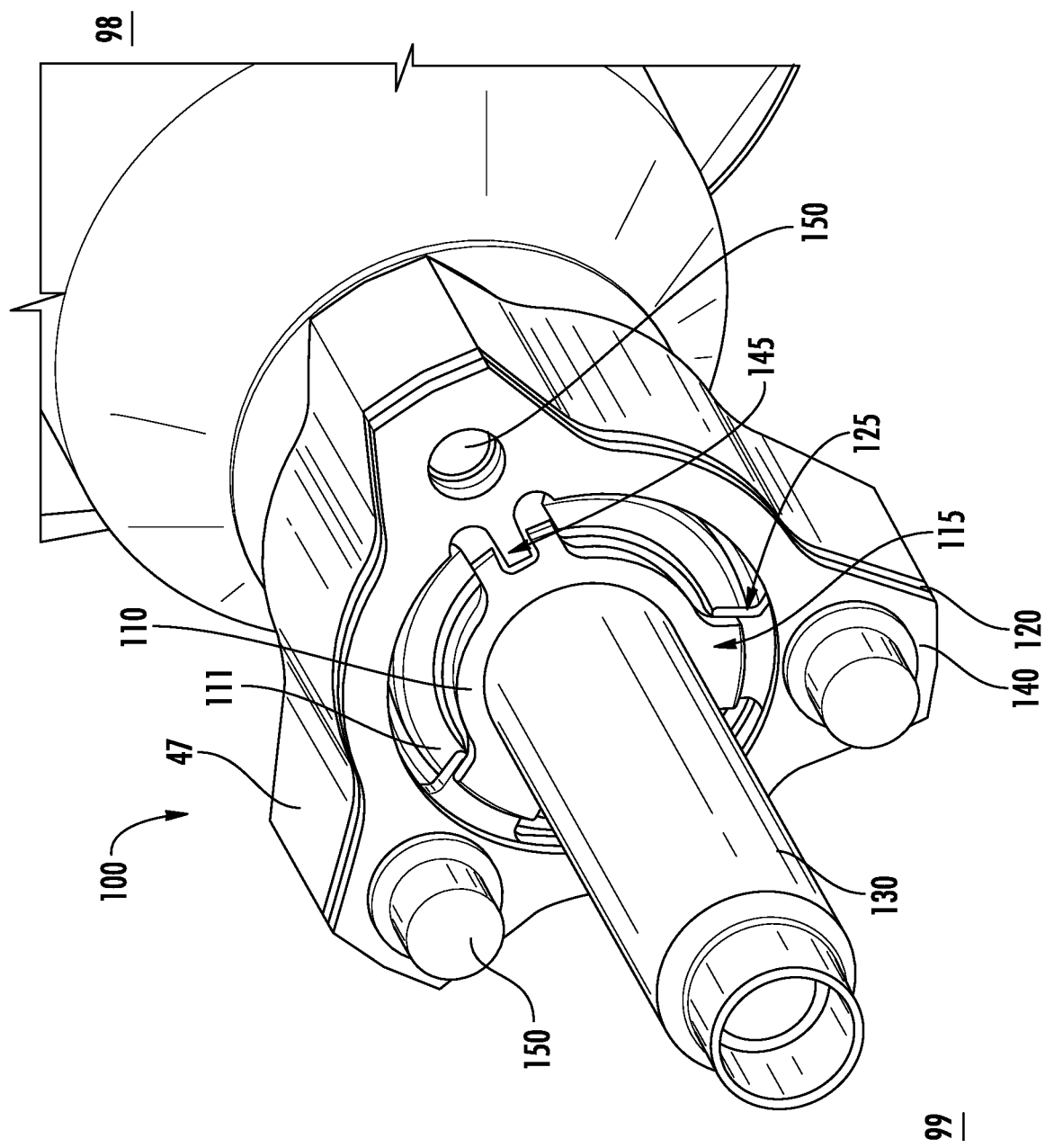
FIG. 3 is another cutaway profile view of a portion of the gearbox assembly shown in FIG. 1.

Referring now to the perspective view of the exemplary embodiment of the system 100 shown in FIG. 3, the system 100 may further include a second retainer 140 defining one or more second retainer tabs 145 extended inward in the radial direction R. The second retainer 140 is disposed toward an end of the system 100 (e.g. the first end 99) such that the system 100 includes the serial arrangement along the axial direction A of the second retainer 140, the sleeve tab(s) 115, the retainer 120 and retainer tabs 125, and the outer wall 111 of the sleeve 110. The one or more sleeve tabs 115 may be disposed between the one or more retainer tabs 125 and the one or more second retainer tabs 145 along the axial direction A.

In various embodiments, the second retainer 140 may include a material defining an ultimate tensile strength that is higher than the sleeve 110 and/or the retainer 120. In one embodiment, the second retainer 140 includes a material defining an ultimate tensile strength that is higher than the sleeve tabs 115 and/or the retainer tabs 125.

The retainer 120 and the second retainer 140 may each define one or more fastening locations 150 at which the retainer 120 and the second retainer 140 attach to the housing 47. In one embodiment, the fastening locations 150 each define an orifice through which a mechanical fastener attaches to the housing 47 (e.g. a bolt into a threaded orifice in the housing 47, a bolt through the retainer 120, second retainer 140, and housing 47 retained by a nut, a rivet, or a pin, or safety wire, or Bergen cable, or combinations thereof). In another embodiment, the fastening locations 150 each define a bonding location and method, such as a welding or soldering location or an adhesive. In still other embodiments, the fastening locations 150 may each define a combination of mechanical fasteners and bonding locations and methods.

Figure 4:
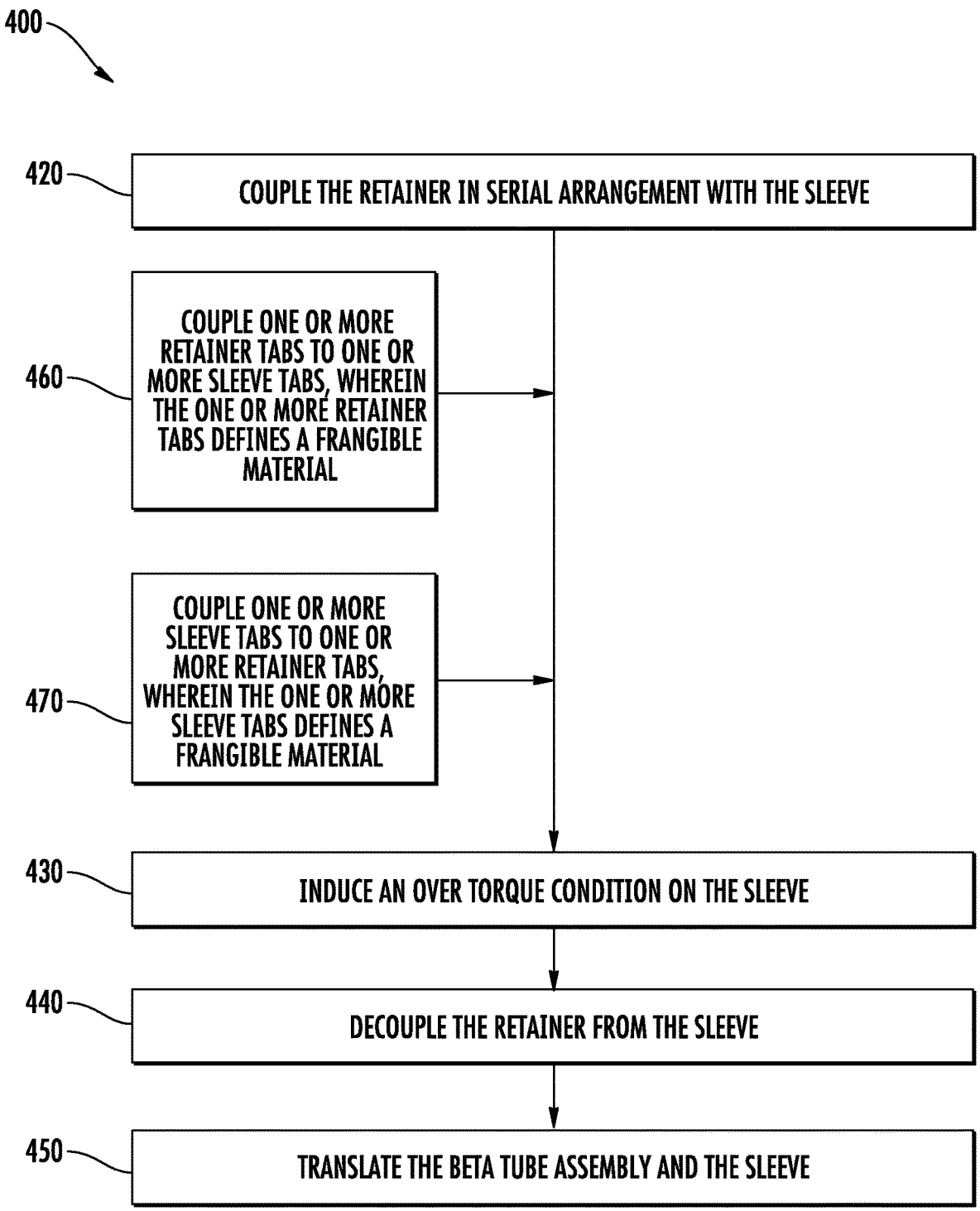
FIG. 4 is a flowchart outlining exemplary steps of a method of arranging a propeller assembly feathering failsafe.

Referring now to FIG. 4, a flowchart of an exemplary embodiment of a method of feathering propeller assembly in an overtorque condition (herein referred to as "method 400") is generally provided. The method 400 may change an angle of a plurality of blades of a propeller assembly during or following an overtorque condition such as the blades 42 of the propeller assembly 14 about the pitch axis 13 shown and described in FIGS. 1-5. FIG. 4 depicts steps performed in a particular order for the purposes of illustration and discussion. Those of ordinary skill in the art, using the disclosures provided herein, will understand that various steps of any of the methods disclosed herein can be adapted, modified, rearranged, omitted, or expanded in various ways without deviating from the scope of the present disclosure.

The method 400 may generally be performed in a system defining a beta tube assembly surrounded by a sleeve within a housing, such as the beta tube assembly 130, the sleeve 110, the retainer 120, and the housing 47 described in the system 100 shown and described in regard to FIGS. 1-5. The method 400 generally includes at 420 coupling the retainer in serial arrangement with the sleeve, at 430 inducing an overtorque condition on the sleeve via seizure of hydraulic fluid within the system, at 440 decoupling the retainer from the sleeve, and at 450 translating the beta tube assembly and the sleeve.

In various embodiments, the method 400 may further include at 460 coupling one or more retainer tabs to one or more sleeve tabs, wherein the one or more retainer tabs defines a frangible material. In one embodiment, the frangible material defines an ultimate tensile strength less than approximately a force applied to the one or more retainer tabs during an overtorque condition on the sleeve. For example, defining one or more retainer tabs of a frangible material may include defining the one or more retainer tabs 125 as shown and described in FIGS. 1-3.

In other embodiments, the method 400 may further includes at 470 coupling one or more sleeve tabs to one or more retainer tabs, wherein the one or more sleeve tabs defines a frangible material. In one embodiment, the frangible material defines an ultimate tensile strength less than approximately a force applied to the one or more sleeve tabs during an overtorque condition on the sleeve. For example, defining one or more sleeve tabs of a frangible material may include defining the one or more sleeve tabs 115 as shown and described in FIGS. 1-3.

In an embodiment of the method 400 at 440, decoupling the axial retention feature from the sleeve includes decoupling each retainer tab from the sleeve and/or sleeve tabs. In another embodiment at 440, decoupling the axial retention feature from the sleeve includes decoupling each sleeve tab from the retainer and/or retainer tabs. For example, as shown in FIGS. 1-3, the sleeve 110 may define sleeve tabs 115 of which are coupled to the retainer tabs 125. The sleeve tabs 115 and/or the retainer tabs 125 may be decoupled from serial axial arrangement by breaking, fracturing, bending (e.g. such as a living hinge), or otherwise displacing to permit axial movement of the beta tube assembly 130 and therefore permit feathering of the blades 42 about the pitch axis 13.

Referring now to FIG. 5, a perspective view of an exemplary embodiment of a propeller assembly 14 is generally provided. The propeller assembly 14 shown and described in FIGS. 1-5 may generally apply to turboprop, turboshaft, wind turbine, or reciprocating engines including a pitch adjustment or feathering mechanism. The system 100 shown and described herein may be applied to the propeller assembly 14. In various embodiments, a flow of a fluid (e.g. air or water), shown schematically by arrows 90, passes across the plurality of blades 42 of the propeller assembly 14. The propeller assembly is generally coupled to the housing 47, which may further include the gearbox 45, and generator or engine core 20. The propeller assembly 14 generally must operate at a rotational speed at least partially regulated by the turbine 10. In one embodiment, the propeller assembly 14 must generally prevent damage at least partially due to overspeed of the plurality of blades 42 to the propeller assembly 14, generator or engine core 20, gearbox 45, or other components, power systems, etc. attached thereto. The feathering mechanism 60 (shown in FIGS. 1-3) adjusts the angle of the plurality of blades 42 about the pitch axis 13 to induce or reduce aerodynamic drag across the blades 42 as the air 90 passes.

However, in various conditions, the plurality of blades 42 may receive an amount of force (e.g. from high velocities of fluid 90) that induces a rate of change in angle about the pitch axis 13 greater than can be accommodated or responded to by the feathering mechanism 60 or generator or engine core 20, thereby resulting in an overtorque condition that may damage the turbine 10 or various components therewithin. The overtorque condition may additionally or alternatively result from binding, seizure, or stoppage of translation of the beta tube assembly 130. The embodiments of the system 100 and method 400 shown and described in regard to FIGS. 1-5 may permit feathering, or change in angle about the pitch axis 13 of the plurality of blades 42, during or following an overtorque condition by permitting translation of the beta tube assembly 130 that is coupled to the feathering lever 61 of the feathering mechanism 60.

The various embodiments of the feathering mechanism 60, the system 100, and method 400 described herein may improve upon existing turbines and turbine feathering mechanisms by reducing a quantity of parts or components of the system, providing a simpler structure and/or method of replacing failsafe components, and/or improving overall propeller assembly and turbine safety by providing an automatic feathering position system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A system for feathering a propeller assembly, wherein the system is disposed within a housing of the propeller assembly, the system comprising:
   a sleeve defining an outer wall and one or more sleeve tabs extended outward in a radial direction along at least a circumferential portion of the sleeve, wherein the one or more sleeve tabs is separated from the outer wall in an axial direction;
   a retainer defining one or more retainer tabs extended inward in the radial direction, wherein the one or more retainer tabs is disposed between the outer wall and the one or more sleeve tabs of the sleeve along the axial direction; and
   a beta tube assembly extended through the sleeve along the axial direction,
   wherein the beta tube assembly defines one or more internal walls, and
   wherein the one or more internal walls defines a hydraulic fluid transfer cavity in fluid communication with one or more hydraulic fluid transfer orifices.

2. The system of claim 1, further comprising:
   a second retainer defining one or more second retainer tabs extended inward in the radial direction,
   wherein the one or more sleeve tabs is disposed between the one or more retainer tabs and the one or more second retainer tabs.

3. The system of claim 1, wherein the one or more retainer tabs of the retainer are defined by a frangible material configured to detach from the retainer at a force corresponding to a critical torque value applied by the beta tube assembly onto the sleeve.

4. The system of claim 1,
   wherein the one or more retainer tabs define a first material and the sleeve defines a second material, and
   wherein the first material defines an ultimate tensile strength less than the second material.

5. The system of claim 1,
   wherein the one or more retainer tabs define a first material and the sleeve defines a second material, and
   wherein the first material defines an ultimate tensile strength less than the second material at a force applied by the sleeve during an overtorque condition.

6. The system of claim 1, wherein the one or more sleeve tabs of the sleeve are defined by a frangible material configured to detach from the sleeve at a force corresponding to a critical torque value applied by the sleeve to the retainer.

7. The system of claim 1,
wherein the one or more sleeve tabs define a first material,
wherein the outer wall and the retainer define a second material, and
wherein the first material defines an ultimate tensile strength less than the second material.

8. The system of claim 1, wherein the sleeve defines an axial space between the one or more sleeve tabs and the outer wall in the axial direction.

9. The system of claim 8, wherein the one or more retainer tabs is disposed in the axial space defined by the sleeve.

10. The system of claim 1, wherein the sleeve and the beta tube assembly define radially therebetween a first fluid cavity and a second fluid cavity separated from the first fluid cavity by one or more internal sleeve walls.

11. The system of claim 10, wherein the sleeve defines one or more sleeve fluid inlet ports in fluid communication with the hydraulic fluid transfer cavity.

12. A method of feathering a propeller assembly in an overtorque condition via a feathering propeller assembly failsafe system,
wherein the feathering propeller assembly failsafe system includes a beta tube assembly surrounded by a sleeve within a housing, and a retainer,
wherein the method comprises:
coupling the retainer directly with the sleeve;
inducing the overtorque condition on the sleeve via seizure of hydraulic fluid within the feathering propeller assembly failsafe system;
decoupling the retainer from the sleeve; and
translating the beta tube assembly and the sleeve.

13. The method of claim 12,
wherein the retainer defines one or more retainer tabs extended in a radial direction,
wherein the sleeve defines one or more sleeve tabs extended in the radial direction, and
wherein decoupling the retainer from the sleeve includes decoupling each of the one or more retainer tabs from the sleeve and/or the one or more sleeve tabs.

14. The method of claim 12,
wherein the retainer defines one or more retainer tabs extended in a radial direction,
wherein the sleeve defines one or more sleeve tabs extended in the radial direction, and
wherein decoupling the retainer from the sleeve includes decoupling each of the one or more sleeve tabs from the retainer and/or the one or more retainer tabs.

15. The method of claim 12, further comprising:
coupling one or more retainer tabs of a frangible material to one or more sleeve tabs,
wherein the frangible material defines an ultimate tensile strength less than a force applied to the one or more retainer tabs during the overtorque condition on the sleeve.

16. The method of claim 12, further comprising:
coupling one or more sleeve tabs of a frangible material to one or more retainer tabs,
wherein the frangible material defines an ultimate tensile strength less than a force applied to the one or more sleeve tabs during the overtorque condition on the sleeve.

17. A gas turbine engine defining a feathering failsafe system, the gas turbine engine comprising:
a propeller assembly comprising a hollow piston rod extended along an axial direction and a plurality of blades rotatable about an axial centerline and configured to rotate about a pitch axis extended from the axial centerline;
a housing, wherein the propeller assembly and the housing are disposed in adjacent arrangement along the axial direction; and
a feathering mechanism defined in the propeller assembly and the housing, wherein the feathering mechanism comprises:
a sleeve defining an outer wall and one or more sleeve tabs extended outward in a radial direction along at least a circumferential portion of the sleeve, wherein the one or more sleeve tabs is separated from the outer wall in an axial direction;
a retainer defining one or more retainer tabs extended inward in the radial direction, wherein the one or more retainer tabs is disposed between the outer wall and the one or more sleeve tabs of the sleeve along the axial direction; and
a beta tube assembly extended through the sleeve along the axial direction,
wherein the beta tube assembly defines one or more internal walls, and
wherein the one or more internal walls defines a hydraulic fluid transfer cavity in fluid communication with one or more hydraulic fluid transfer orifices.

18. The gas turbine engine of claim 17, wherein the feathering mechanism further comprises:
a second retainer defining one or more second retainer tabs extended inward in the radial direction, wherein the one or more sleeve tabs is disposed between the one or more retainer tabs and the one or more second retainer tabs.

19. The gas turbine engine of claim 17, wherein the one or more retainer tabs of the retainer are defined by a frangible material configured to detach from the retainer at a force corresponding to a critical torque value applied by the beta tube assembly onto the sleeve.

20. The gas turbine engine of claim 17,
wherein the retainer tabs define a first material and the sleeve defines a second material, and
wherein the first material defines an ultimate tensile strength less than the second material.

* * * * *